US005181273A

United States Patent [19]

Ohtani

[11] Patent Number: 5,181,273

[45] Date of Patent: Jan. 19, 1993

[54] ELECTRONIC APPARATUS HAVING A CALENDAR-DISPLAY FUNCTION

[75] Inventor: Yuji Ohtani, Urawa, Japan

[73] Assignee: Casio Computer Co., Ltd., Tokyo, Japan

[21] Appl. No.: 685,160

[22] Filed: Apr. 12, 1991

Related U.S. Application Data

[63] Continuation of Ser. No. 369,694, Jun. 21, 1989, abandoned.

[30] Foreign Application Priority Data

Jul. 7, 1988 [JP] Japan .......................... 63-90085[U]

[51] Int. Cl.[5] .............................................. G06F 15/40

[52] U.S. Cl. ................................... 395/161; 345/155; 340/706

[58] Field of Search ................ 364/518, 521; 340/706, 340/710; 395/155, 161

[56] References Cited

U.S. PATENT DOCUMENTS 4,817,018 3/1989 Cree et al. .......................... 364/518
4,819,191 4/1989 Scully et al. ........................ 364/518

*Primary Examiner*—Gary V. Harkcom
*Assistant Examiner*—Phu K. Nguyen
*Attorney, Agent, or Firm*—Frishauf, Holtz, Goodman & Woodward

[57] ABSTRACT

A small sized electronic apparatus has a display section to display a calendar. The number of days between two dates designated on the displayed calendar is counted. When a date has been set as a particular day, the number of days excluding the particular day can be also counted.

13 Claims, 5 Drawing Sheets

ELECTRONIC APPARATUS HAVING A CALENDAR-DISPLAY FUNCTION

This application is a continuation of application Ser. No. 07/369,694, filed Jun. 21, 1989, now abandoned.

BACKGROUND OF THE INVENTION

1. Field of the Invention

The present invention relates to a small sized electronic apparatus having a day-counting function which is capable of displaying a calendar.

2. Description of the Related Art

Recently, small sized electronic apparatuses such as, for example, electronic calculators having a day-counting function are available.

In these electronic calculators, when, for example, the date, i.e., month, day and year after 30 days from the present date are to be counted, data of the present date, i.e., "month", "day" and "year" in addition to "30" are input by key-operations and thereby the date, i.e., "month", "day" and "year" after 30 days from the present date are obtained.

There has been a disadvantage in operating these electronic calculators, however, that several and troublesome key operations are necessary to input required data, that is, key operations are necessary for two times, two times and four times to input data of "month", "day" and "year", respectively.

Further, since only numeral data are displayed on the electronic calculator, it is difficult to visually confirm which numerals correspond to the calendar data, such as "month", "day" and "year" data.

SUMMARY OF THE INVENTION

It is an object of the present invention to provide a small sized electronic apparatus which is capable of counting days with simple operations.

It is another object of the present invention to provide a small sized electronic apparatus which is capable of counting days except certain days, which have been specified in the calendar.

According to the present invention, there are provided a small sized electronic apparatus comprising:

displaying means for displaying a calendar;

designation means for designating a first date and a second date on the calendar displayed by said displaying means; and counting means for counting number of days between the first and second dates designated by said designation means and also a small sized electronic apparatus comprising:

calendar display means for displaying a calendar;

selection means for selecting dates on the calendar displayed by said calendar display means;

memory means for storing the dates selected by said selection means as particular days;

designation means for designating a first date and a second date on the calendar displayed by said calendar display means; and counting means for counting days except said particular days between the first and second dates designated by said designation means.

Other features and advantages of the present invention may be more fully understood from the following detailed description when taken in conjunction with the accompanying drawings.

DETAILED DESCRIPTION OF THE PRESENT INVENTION

Arrangement of Electronic Apparatus

Figure 1:
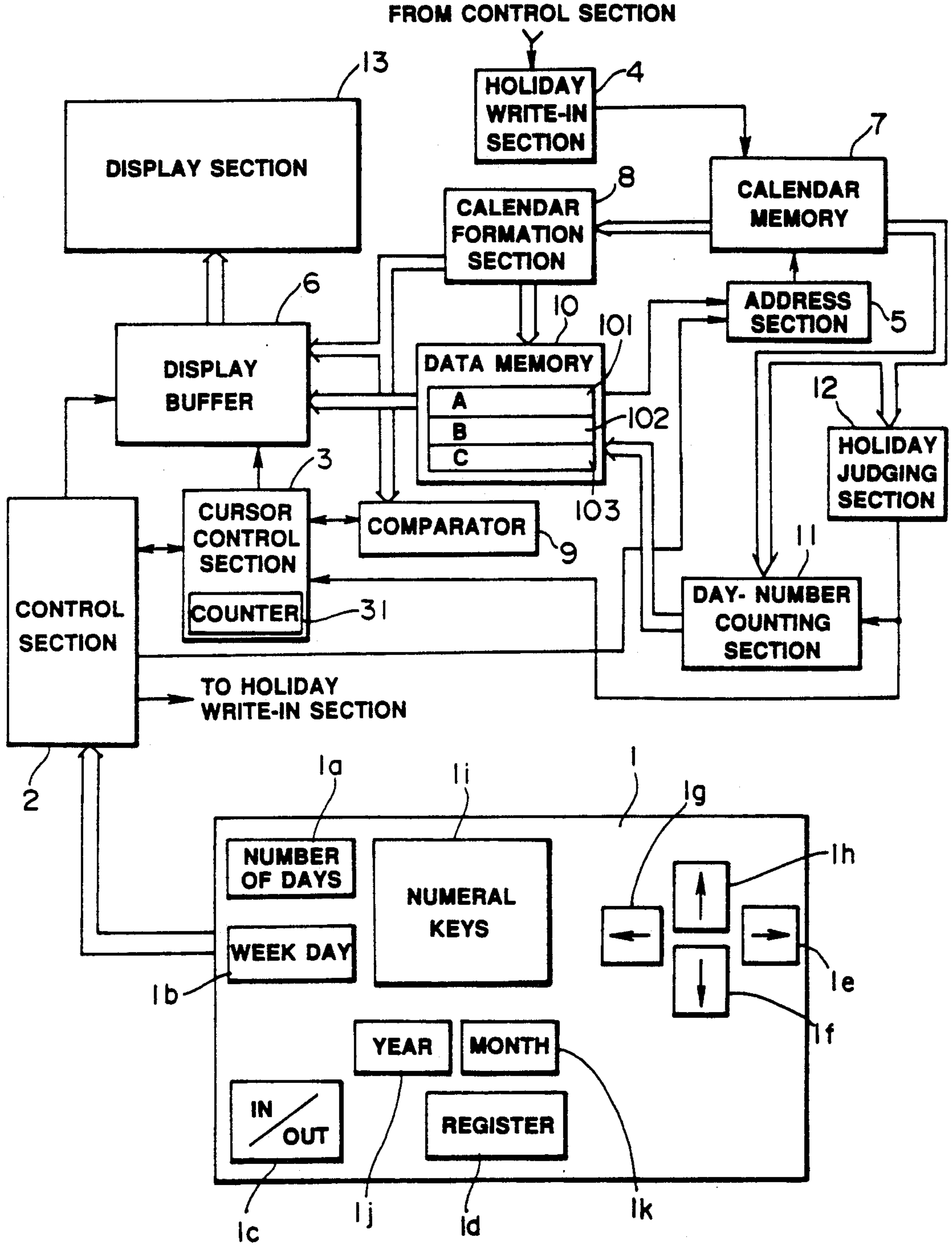
FIG. 1 is a block diagram illustrating an electronic apparatus having a calendar-display function.

In FIG. 1, a numeral 1 stands for a key input section. The key input section 1 comprises a "day number" key 1*a* for designating a day-number counting mode, a "weekday" key 1*b* for designating a weekday-number counting mode, an "IN/OUT" key 1*c* for selecting an input mode or an output mode, a "register" key 1*d* for registering a particular day and a holiday, a cursol keys 1*e* through 1*h*, numeral keys 1*i*, a "year" key 1*j* and a "month" key 1 key.

Data input through the key input section 1 are delivered to a control section 2. The control section 2 comprises a ROM, where a program for controlling circuits has been stored. The control section 2 supplies control instructions to a cursol-control section 3, a holiday write-in section 4 and an address section 5. The control section 2 further supplies to a display buffer 6 data input through the key-input section 1.

The cursol-control section 3 supplies to the display buffer 6 its outputs corresponding to operations of the cursol keys 1*e* through 1*h* of the key-input section 1. The cursol-control section 3 has a counter 31 which counts dates. The holiday write-in section 4 seves to write holiday data into a calendar memory 7. The address section 5 serves to control addresses for "write-in" and "read-out" of the calendar memory 7.

Figure 2:
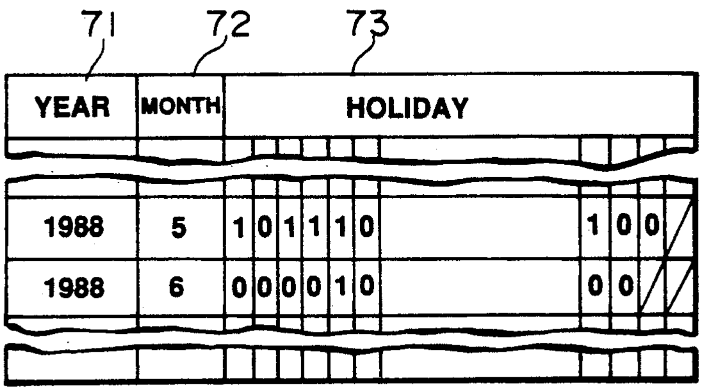
FIG. 2 is a view illustrating a construction of a calendar-memory.

The calendar memory 7 comprises memory areas 71 through 73 as shown in FIG. 2. The memory area 71 stores year data of four digits, the memory area 72 stores month data from January to December relative to each year stored in the memory area 71 and the memory area 73 stores holidays in each month from January to December. The memory area 73 for storing holidays in each month consists of 4 bytes (32 bits) and one day corresponds to one bit. A value "1" is written in bit-positions corresponding to holidays through the holiday write-in section 4 by operating the key-input section 1. The value "1" may be previously written in bit-positions corresponding to Sundays and national holidays in the production line.

Data read out from the calendar memory 7 are supplied to a calendar-formation section 8. The calendar formation section 8 calculates day of the week of the first day in a month and number of days in the month from data such as year and month data read out from the calendar memory 7, and writes these calculated data, i.e., calendar data in the display buffer 6. The calendar-formation section 8 supplies last-day data in the month to a comparator 9 and calculates the dates corresponding to the bits designated in the calendar memory 7, and supplies the calculation result to a data memory 10. The comparator 9 compares the last day data of the month with a count value of a counter 31 in the cursol-control section 3 and, when the count value exceeds the last day data of the month, outputs an instruction so as to display the following month and resets contents of the counter 31. The data memory 10 comprises an A-register 101 in which a start-date data is written, a B-register 102 in which an end-date data is written and a C-register 103 in which a data of number of days between the start-date and the end-date is written. The data memory 10 supplies the start-date data and the end-date data to the address section 5 and reads out the corresponding data from the calendar memory 7. The data read out from the calendar memory 7 are supplied to a day-number counting section 11 and a holiday-judging section 12. The day-number counting section 11 counts number of days between the start-date and the end-date read out from the calendar memory 7 and supplies the count-result to the date-memory 10. The holiday-judging section 12 judges a holiday from the data read out from the calendar memory 10 and supplies the judging result to the day-number counting section 11 and the cursol-control section 3.

A numeral 13 denotes a display section for indicating contents of the display buffer 6.

OPERATION OF APPARATUS

Now, the operation of the embodiment constructed as mentioned above will be described.

Figure 3:
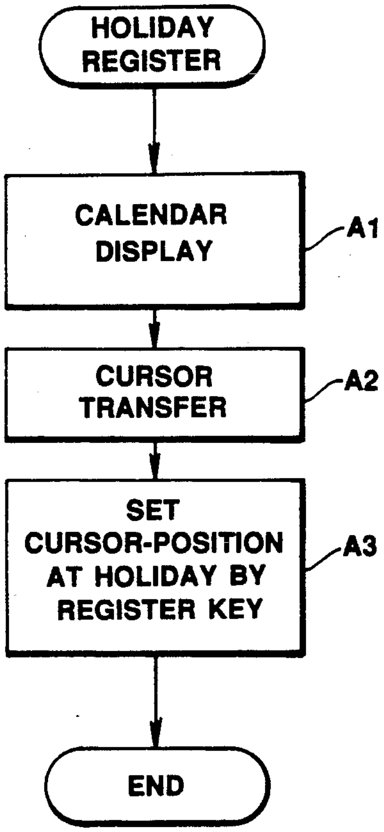
FIG. 3 is a flow chart illustrating operations for setting a holiday.

At first, the operation for registering a holiday will be described referring to FIG. 3. An OUT mode is set by operation of the IN/OUT key or mode setting key 1*c*. When data, for example, "1988", "year" and "5", "month" are input by operation of the key-input section 1 at Step Al, calendar data of "May, 1988" are read out from the calendar memory 7. Then, these calendar data, such as "year" data and "month" data each are supplied to the calendar-formation section 8 and the day of the week of the first day in the month is calculated and number of days in the month (in this case, 31 days) is decided. The above results are written in the display buffer 6 and are displayed on the display section 13. In this case, since as illustrated in FIG. 2, Sundays and national holidays have been registered in the holiday-memory area 73 and the corresponding bits have been set at "1", the relavant displays are reversed.

An IN mode is designated by operation of the mode-setting key 1 under the above display state and the operation advances to Step A2 and wherein the cursol is moved by operation of the cursol keys 1*e* through 1*h* so as to designate a desired day to be registered as a holiday. And, as shown at Step A3, the "register" key 1*d* is depressed. Then, the holiday write-in section 4 sets the bit corresponding to the cursol position at the value "1", which bit is in the holiday write-in area 73 of the calendar memory 7, and thereby the holiday can be set.

Figure 5A:
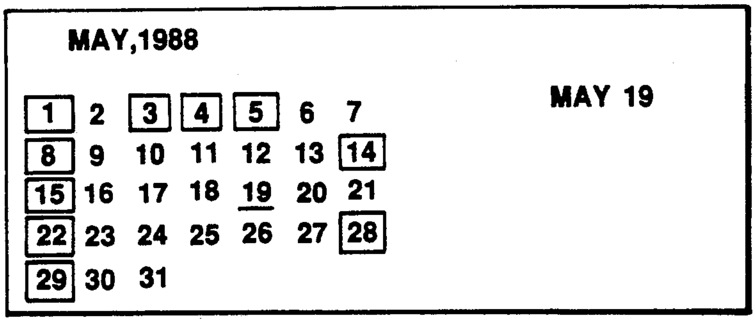
FIG. 5A to 5B are views illustrating examples of display of a display section.

FIG. 5A is a view illustrating a calendar of May, 1988, in which 14th day and 28th day have been newly registered as holidays.

DAY COUNTING PROCESS

Figure 4:
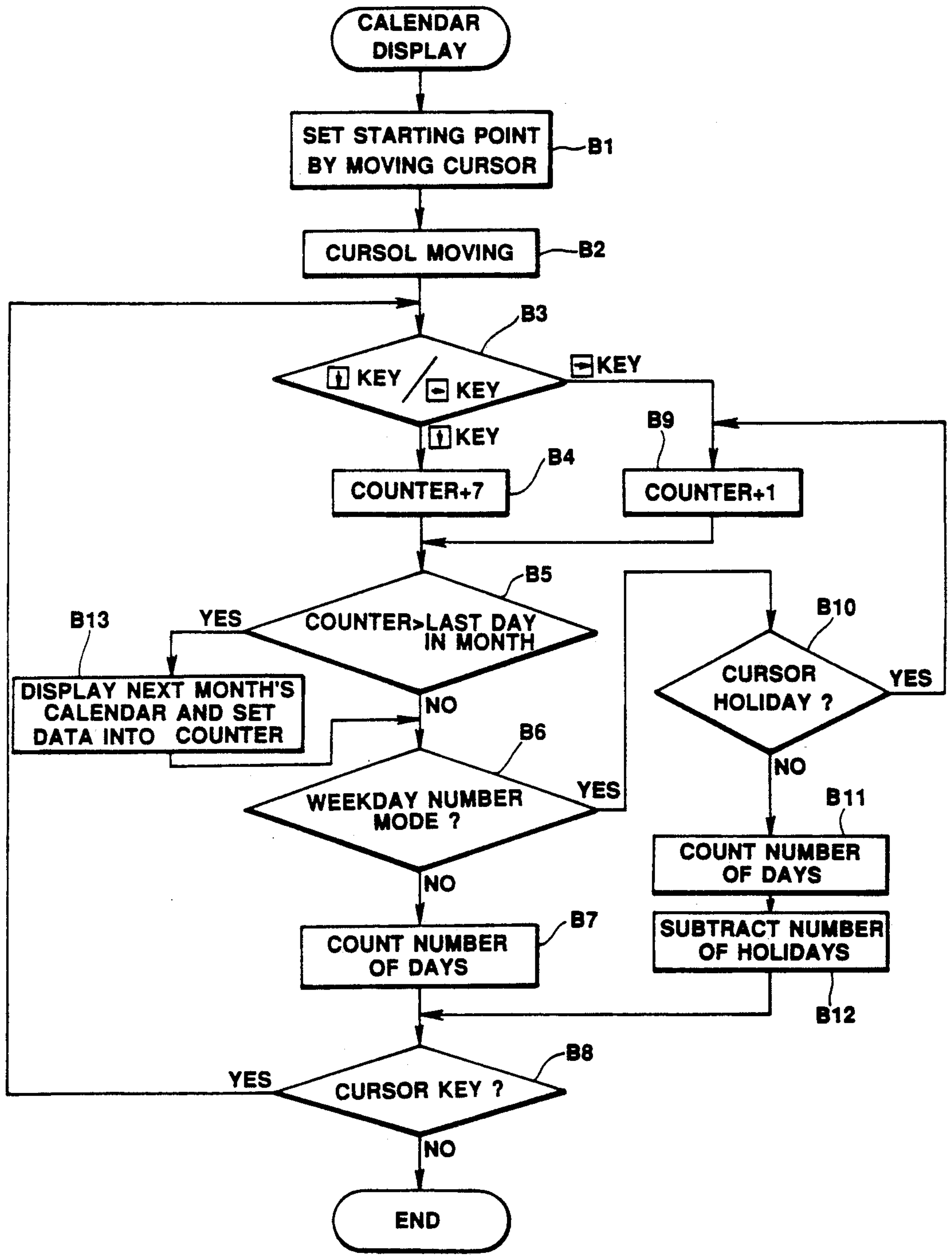
FIG. 4 is a flow chart illustrating operations for counting days.

The operation for counting number of days will be described referring to FIG. 4. At first, the OUT mode is set by operation of the mode setting key 1*c* and also a day-number counting mode is set by operation of the "day-number" key 1*a*. At Step B1, a starting point is set by operation of the cursol. In this case, the cursol is moved by operation of the cursol keys 1*e* through 1*h* so as to designate a particular day, which is represented by the starting point of the cursol. In case that 19th day is set as the starting point, 19th day is designated by the carsol and in this state, the "register" key 1*d* is operated. Then 19th day is registered as the starting point, and a bar is displayed under 19th day and also the date, "May 19" are displayed at the side space of the calendar, as shown in FIG. 5A. In this case, the starting data, "May 19" are written in the A register 101 of the data memory 10 and the counter 31 of the cursol control section 3 is set at "19".

In this state, the cursol is moved at Step B2. In case number of days between 19th day and 27th day is the "↓" key 1*f* is operated and then "→" key 1*e* is operated. These operations will be described in detail. When "↓" key 1*f* is operated, the operation advances to Step B4 through Step B3 and wherein the count value of the counter 31 in the cursol-control section 3 is added by "+7", resulting in "26". When the counter 31 has been set at "26", as described above, the address section 5 designates the bit of the calendar memory 7 corresponding to "26th day". The calendar-formation section 8 calculates "May 26" from the bit data and writes the data, "May 26" into the B register 102 of the data memory 10.

At Step B5, the comparator 9 compares the count value of the counter 31 with a value of the last day in the month, but the result of the comparation is "NO" in this case, so that the operation advances to Step B6. It is confirmed at Step B6 that the weekday-number counting mode is not set and therefore the result is "NO". The operation further advances to Step B7. At Step B7, the day-number counting section 11 counts bits of the calendar memory 7 on the basis of the contents of A-register 101 and the contents of B-register 102 of the data memory 10.

The above counting process is executed in the following manner. At first, 1 bit of the calendar memory 7 corresponding to a date stored in the A-register is designated and the 1 bit data is supplied to the day-number counting section 11. Bit data are sequentially supplied till the bit data corresponding to the date stored in the B-register 102 is designated. The day-number counting section 11 counts up number of the supplied data, no matter whether the supplied data is "0" or "1".

Accordingly, the counted number is the number of days between the two dates designated by the cursol and is written into the C-register. At this time, content of the C-register is "7".

And when "→" key 1*f* is operated, the result of the processing at Step B8 becomes "YES" and the operation returns to Step B3. Then, the operation advances from Step B3 to Step B9 and the value "+1" is added to the count value of the counter 31 of the cursol control section 3 and the above count value becomes "27". The address section 5 designates a bit corresponding to "27th day" of calendar memory 7 in accordance with the above count value. The calendar-formation section 8 calculates "May 27" from the bit data and newly writes the "May 27" into the B-register 102 of the data memory 10.

Figure 5B:
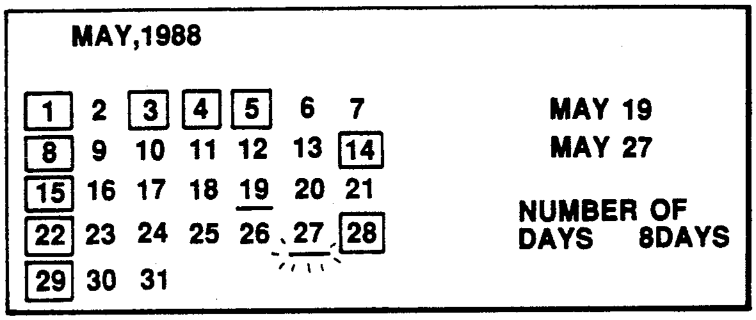

Then, the operation advances to Steps B5 to B7. The day-number counting section 11 counts bits of the calendar memory 7 on the basis of the contents of the A-register 101 and the contents of the B-register 102 of the data memory 10 and writes the counting result into the C-register 103. At this time, the content of the C-register is "8" and is transferred through the display buffer 6 to the display section 13 to be displayed thereon. FIG. 5B is a view showing the display state of the display section 13, and "May 19", "May 27" and "8 days", the result of day-number counting including holidays are displayed on the display section 13 together with the calendar display.

WEEKDAY COUNTING PROCESS

A weekday-number counting operation will be described referring to FIG. 4. The OUT mode is set by operation of the mode-setting key 1c and the weekday-number counting mode is set by operation of the "day-number" key la and the "weekday" key 1c. Also in this case, the starting point is set at Step B1 by moving the cursol in the similar manner to the mentioned above. If, also in this case, 19th day is designated as a particular day or the starting point, a bar appears under the 19th day as shown in FIG. 5A and "May 19" is displayed at the side portion of the calendar display. The starting point data "May 19" is written into the A-register 31 of the data memory 10 and the count value of the counter 31 of the cursol-control section 3 becomes "19".

At Step B2, the cursol is moved. When a counting operation of number of weekdays between May 19 and June 1, " ↓ " key is continuously operated for two times. At first, when " ↓ " key 1f is operated for the first time, the operation advances through Step B3 to Step B4 and the value "+7" is added to the count value of the counter 31 of the cursol-control section 3. Then, the count values add up to "26" and the operation advances to Step B5. The comparator a compares at Step B5 the count value of the counter 31 and the value of the last day in the month. Since the result of the processing at Step B5 is "NO" in this case, the operation advances to Step B6. The weekday-number counting mode has been set and therefore the result of the processing at Step B6 is "YES". Then the operation advances to Step B10. It is judged at Step B10 whether or not the cursol stays at a holiday position at present. If the result is "YES", the operation returns to Step B9 and the value "+1" is added to the counter 31. But since the result is "NO" in this case, the operation advances to Step B11. At Step B11, in the same manner as the described manner at Step B7, the day-number counting section 11 counts bits of the calendar memory 7 on the basis of the contents of the A-register 101 and the contents of the B-register 102 of the data memory 10.

In the meantime, the bit data read out from the calendar memory 7 are supplied to the holiday-judging section 12, too. The holiday-judging section counts only "1" among the bit data supplied to the holiday judging section 12.

At Step B12, the number of holidays obtained by the holiday-judging section 12 is subtracted from the number of days obtained by the day-number counting section 11 and the result of the subtraction is supplied to the C-register 103. At this time, the content of the C-register 103 becomes "6".

Under this state, when " ↓ " key 1f is operated again, the result of processing at Step B8 becomes "YES" and the operation returns to Step B3. Then, the operation advances from Step B3 to Step B4. At Step B4, the value "+7" is added to the count value of the counter 31 of the cursol-control section 3 and the count value adds up to "33". Then, since the comparator 9 judges at Step B5 that the count value "33" of the counter 31 is larger than the date value of the last day in the month, the result of the process at Step B5 is "YES" and the operation advances to Step B13. At Step B13, the calendar-formation section 8 supplies calendar data of the following month, calendar data of June in this case to the display buffer 6 and displays the calendar data on the display section 13. Further, the value of the counter 31 is obtained as follows:

"33"−"31"="2"

and the result "2" is set in the counter 31.

Then the operation advances to Step B6. The result of processing at Step B6 is "YES", so that the operation advances to Step B10. It is judged at Step B10 whether or not the cursol stays at a holiday position at present. Since the result is "NO", the operation advances to Step B11.

Figure 5C:
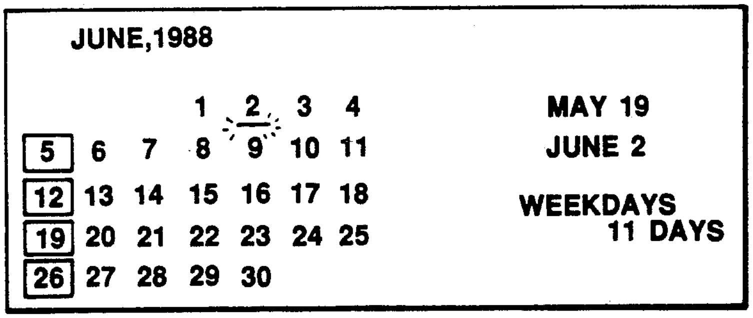

At Step B11, the day-number counting section 11 counts bits of the calendar memory 7 on the basis of contents of the A-register 101 and contents of the B-register 102 of the data memory 10 and obtains the number of days. And then the operation advances to Step B12. At Step B12, the day-number counting section 11 subtracts the number of holidays counted by the holiday-judging section 11 from the above number of days. The result of the above subtraction is written into the C-register 103. The content of the C-register 103 at this time is "11" and is displayed on the display section 13 through the display buffer 6. One example of the dispaly on the display section 13 is illustrated in FIG. 5C, where, in addition to the calendar display, "May 19", "June 2" and the result of counting days excluding holidays "11 days" are on display.

ARRANGEMENT OF APPARATUS WITH TOUCH PANEL

It will be easily understood by those skilled in the art that an input means of a tablet type can be provided on the display section for designating dates on the tablet.

Figure 6:
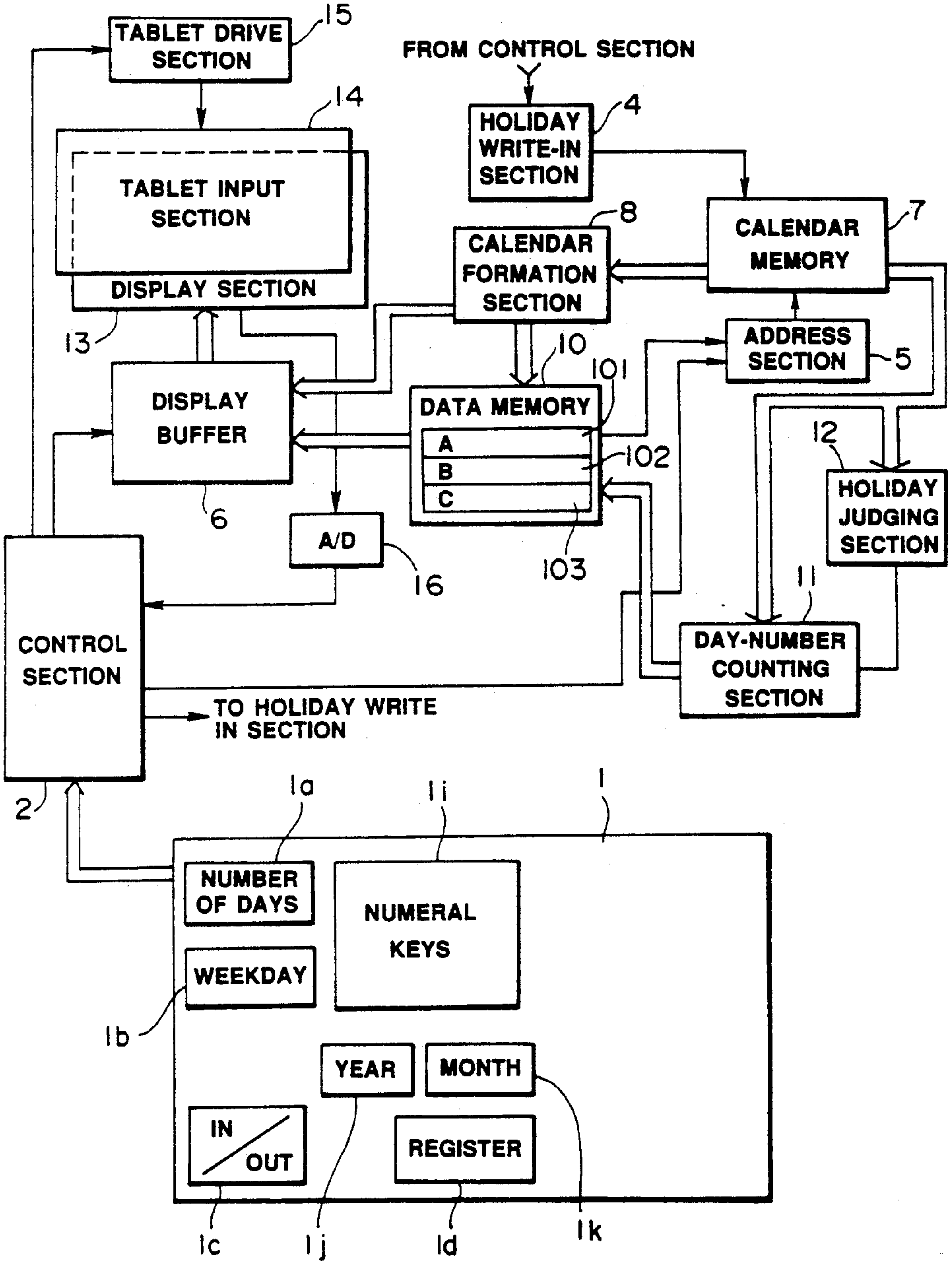
FIG. 6 is a block diagram of a calendar-display electronic apparatus having a tablet-input section.

An embodiment of an electronic apparatus employing an input means of a tablet type is illustrated in FIG. 6, in which like components as those in FIG. 1 are designated by like reference symbols. In the embodiment, a transparent touch panel is provided on the display section 13. When an input section 14 of a tablet type which is driven by a tablet driving section 15 is depressed with a finger, a pen tip and the like, a depressed position signal is output to an A/D converter 16. The A/D converter 16 converts depressed position signal into co-ordinates data and outputs the co-ordinates data to the control section 2.

Accordingly, when positions on the tablet corresponding to "19" and "27" on the calendar displayed as shown in FIG. 5A are depressed, the control section 2 reads the positions and sends an instruction for designating dates to the address section 5.

As a result, a starting date and a terminating date are stored in the A-register 101 and the B-register 102 of the data memory 10 in the same manner as designated by the cursol, and number of days can be counted in the same way as the described above.

It will be apparently understood from the above description that holidays can be designated by inputting through the tablet.

Further, as described above, the designated date can be indicated not only by an under bar display but also by a blinking display.

What is claimed is:

1. A small sized electronic apparatus comprising:

displaying means including a liquid crystal display device of a dot-matrix type for displaying a calendar of at least one month;

cursor display means for displaying a cursor in order to indicate an arbitrary one date on the displayed calendar;

key input means including at least one user operated cursor key for enabling a user to move the cursor on the displayed calendar by operation of said at least one cursor key;

designating means, responsive to an operation of said at least one cursor key of said key input means, for designating a first date which represents a start point for day number counting;

counting means for counting a number of days between said first date and a second date indicated by the cursor each time said at least one cursor key is operated after designating said first date to indicate the second date on the displayed calendar;

display means for displaying the number of days counted by said counting means.

2. A small sized electronic apparatus according to claim 1, further comprising:

detecting means for detecting that the cursor, moved on said display means responsive to operation of said at least one cursor key, exceeds a position of at least day in a month displayed by said display means; and changing means for changing the displayed calendar to the following month when said detecting means detects that the position of said cursor on the displayed calendar exceeds the last day in the displayed month.

3. A small size electronic apparatus according to claim 1, further comprising setting means for setting a data on the displayed calendar indicated by the cursor as a particular day.

4. A small sized electronic apparatus according to claim 3, wherein said displaying means includes means for displaying said particular day set by said setting means in a particular form.

5. A small sized electronic apparatus according to claim 3, further comprising calendar-data memory means having memory areas corresponding to days in each month for storing data representing said particular day set by said setting means at a corresponding memory area in said calendar-data memory means.

6. A small sized electronic apparatus according to claim 3, wherein said counting means includes means for counting a number of days except said particular day set by said setting means between said first data designated by said designating means and said second date indicated by the cursor each time said at least one cursor key is operated.

7. A small sized electronic apparatus according to claim 6, further comprising:

first date display means for displaying the first date designated by said designating means in addition to the calendar display;

second date displaying means for the second date indicated by the cursor in addition to the calendar display; and day-number display means for displaying a day-number counted by said counting means, when the second date is indicated by the cursor.

8. A small sized electronic apparatus according to claim 7, further comprising:

selection means for selecting whether said counting means counts a number of days except the particular day or a number of days including the particular day; and indication means for indicating the result of the selection made by said selection means.

9. A small sized electronic apparatus, comprising:

calendar display means including a liquid crystal display device of a dot-matrix type for displaying a calendar;

selection means for selecting dates on the calendar displayed by said calendar display means as particular days;

memory means for storing the dates selected by said selection means as said particular days;

designation means for designating a first date and a second date on the calendar displayed by said calendar display means;

counting means for counting days except said particular days between the first and second dates designated by said designation means; and output means for outputting the number of days counted by said counting means.

10. A small sized electronic apparatus according to claim 9, further comprising:

transparent touch input means provided on said calendar display means, said transparent touch input means outputting a position-signal responsive to a touch at a given position thereon;

and wherein:

said selection means selects dates as said particular days responsive to a respective position-signal output from said transparent touch input means; and said designation means designates said first and second dates responsive to respective position-signals output from said transparent touch input means.

11. A small sized electronic apparatus according to claim 9, wherein said memory means has memory areas for storing days in each month, and data of said particular days are written into memory areas of said memory means corresponding to dates selected by said selection means.

12. A small sized electronic apparatus according to claim 11, wherein said counting means comprises:

discrimination means for discriminating whether or not each date stored in said memory means corresponds to a particular day; and means for counting days other than said particular day in accordance with the result of the discrimination made by said discrimination means.

13. A small sized electronic apparatus according to claim 9, further comprising:

cursor-display means for displaying a cursor on the calendar displayed by said calendar display means;

and wherein:

said selection means includes means for selecting, dates as said particular days responsive to moving of the cursor on the displayed calendar; and said designation means includes means for designating said first and second dates responsive to respective positions on said calendar moving of the cursor responsive to respective positions on said calendar.

* * * * *